(12) United States Patent
Griffin et al.

(10) Patent No.: US 10,867,037 B2
(45) Date of Patent: Dec. 15, 2020

(54) SECURITY MITIGATION ACTION SELECTION BASED ON DEVICE USAGE

(71) Applicant: Hewlett-Packard Development Company, L.P., Houston, TX (US)

(72) Inventors: Jonathan Griffin, Bristol (GB); Adrian Baldwin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 69 days.

(21) Appl. No.: 15/764,484

(22) PCT Filed: Nov. 30, 2015

(86) PCT No.: PCT/US2015/063014
§ 371 (c)(1),
(2) Date: Mar. 29, 2018

(87) PCT Pub. No.: WO2017/095380
PCT Pub. Date: Jun. 8, 2017

(65) Prior Publication Data
US 2018/0276377 A1  Sep. 27, 2018

(51) Int. Cl.
*G06F 21/00* (2013.01)
*G06F 21/55* (2013.01)
(Continued)

(52) U.S. Cl.
CPC ............ *G06F 21/554* (2013.01); *G06F 9/445* (2013.01); *G06F 21/55* (2013.01); *G06F 21/57* (2013.01);
(Continued)

(58) Field of Classification Search
CPC ........ G06F 21/554; G06F 9/445; G06F 21/55; G06F 21/57; G06F 2221/034; H04L 63/1425
See application file for complete search history.

(56) References Cited

U.S. PATENT DOCUMENTS 7,373,659 B1 * 5/2008 Vignoles ............. H04L 63/1416
714/E11.207
8,495,747 B1  7/2013 Nakawatase et al.
(Continued)

FOREIGN PATENT DOCUMENTS

CN  101056210  10/2007
CN  102710598  10/2012
(Continued)

OTHER PUBLICATIONS

Chin et al., "Measuring user confidence in smartphone security and privacy", SOUPS '12 Proceedings of the Eighth Symposium on Usable Privacy and Security, Washington, D.C.—Jul. 11-13, (Year: 2012).*
(Continued)

*Primary Examiner* — Morshed Mehedi
(74) *Attorney, Agent, or Firm* — HP Inc. Patent Department (57) ABSTRACT

Examples disclosed herein relate to selecting a security mitigation action based on device usage. In one implementation, a processor selects a security mitigation action for a device based on information related to usage of the device and associated usage limitations associated with the selected security mitigation action. The processor may output information related to the selected security mitigation action.

13 Claims, 4 Drawing Sheets

(51) Int. Cl.
  *G06F 21/57* (2013.01)
  *H04L 29/06* (2006.01)
  *G06F 9/445* (2018.01)

(52) U.S. Cl.
  CPC .... *H04L 63/1425* (2013.01); *G06F 2221/034* (2013.01)

(56) References Cited

U.S. PATENT DOCUMENTS

| | | | |
|---|---|---|---|
| 8,646,031 | B2 | 2/2014 | Gronich et al. |
| 8,776,241 | B2 | 7/2014 | Zaitsev |
| 8,782,784 | B1 | 7/2014 | Bruskin |
| 9,060,014 | B2 | 6/2015 | Crowley |
| 2005/0027980 | A1* | 2/2005 | Peled ............... G06F 21/10 713/164 |
| 2005/0050351 | A1 | 3/2005 | Cain |
| 2008/0005561 | A1 | 1/2008 | Brown et al. |
| 2008/0092209 | A1* | 4/2008 | Davis ............... G06F 21/316 726/2 |
| 2008/0229417 | A1 | 9/2008 | Genty et al. |
| 2009/0293123 | A1* | 11/2009 | Jackson ........... H04L 63/1458 726/23 |
| 2010/0095365 | A1 | 4/2010 | Hsu et al. |
| 2011/0093917 | A1* | 4/2011 | Alcorn ............. G06F 21/6218 726/1 |
| 2012/0311665 | A1* | 12/2012 | Lim ................. G06F 21/604 726/1 |
| 2013/0091564 | A1* | 4/2013 | Fitzgerald ........ G06F 21/88 726/17 |
| 2014/0033299 | A1* | 1/2014 | McGloin ........... G06F 21/60 726/18 |
| 2014/0136242 | A1* | 5/2014 | Weekes .............. G06Q 40/08 705/4 |
| 2014/0380478 | A1* | 12/2014 | Canning ........... H04L 63/1408 726/23 |
| 2015/0237062 | A1 | 8/2015 | Roytman et al. |
| 2016/0036859 | A1* | 2/2016 | Zaitsev ............. G06F 21/78 726/1 |
| 2016/0241573 | A1* | 8/2016 | Mixer .............. G06F 21/53 |
| 2017/0053108 | A1* | 2/2017 | Jakobsson ......... H04L 63/10 |
| 2018/0027006 | A1* | 1/2018 | Zimmermann ..... H04L 63/0245 726/11 |

FOREIGN PATENT DOCUMENTS

| | | |
|---|---|---|
| CN | 103020511 | 4/2013 |
| CN | 104253820 | 12/2014 |
| CN | 104468161 | 3/2015 |
| CN | 104486292 | 4/2015 |
| KR | 10-2012-0057066 A | 6/2012 |
| WO | WO-2004031953 | 4/2004 |
| WO | WO-2015051181 A1 | 4/2015 |

OTHER PUBLICATIONS

Li et al., "Data security and privacy in wireless body area networks", IEEE Wireless Communications, vol. 17, Issue: 1, February (Year: 2010).*

Jaferian, P. et al; Heuristics for Evaluating It Security Management Tools; Jul. 20-22, 2011; https://cups.cs.cmu.edu/soups/2011/proceedings/a7_Jaferian.pdf.

* cited by examiner

SECURITY MITIGATION ACTION SELECTION BASED ON DEVICE USAGE

BACKGROUND

A security event may occur on a user device, and a security mitigation action may be performed to resolve the event. For example, a system administrator may receive information about threats against devices in the network and initiate an action on a user's device in response to information indicating that the device has been compromised.

BRIEF DESCRIPTION OF THE DRAWINGS

The drawings describe example embodiments. The following detailed description references the drawings, wherein.

DETAILED DESCRIPTION

In one implementation, an automated security mitigation system selects a security mitigation action, and in some cases security mitigation workflow, based on information related to how the device is being used and/or planned to be used during the time period affected by a security mitigation response. For example, a processor, such as a server connected to multiple user devices in a network, may select a security mitigation action for a device based on information related to usage of the device and associated usage limitations associated with the selected security mitigation action. The processor may output information related to the security mitigation action, for example, to transmit or store information about the security mitigation action such that it may be executed on the device.

A system that automatically selects a mitigation action based on device usage may better balance the security interests with the business interest of keeping the device available for high priority uses. For example, a user may indicate that he is in the middle of a high priority presentation. The security mitigation system may select a first mitigation action, for example to prevent the spread of the incident and loss of data, to be executed during the presentation such that the user does not delay all security mitigation actions, and the security mitigation system may delay security mitigation actions that would interfere with the planned device usage during the time period.

In one implementation, the security mitigation system automatically selects a security mitigation workflow based on the device usage. For example, a small or medium size business may not have additional computers to provide to a user to continue working while a security mitigation action is performed on the user's device, and the security mitigation workflow may include a first security incident isolating action to be performed during business hours and a security incident resolving action to be performed after business hours. The security mitigation system may automatically select mitigation actions designed to provide flexibility for device use but with security mitigation constraints, such as where flexibility is provided within a smaller time window but particular actions are performed within a larger time frame regardless of device usage. Allowing users to provide information about preferred usage tradeoffs may additionally make users more aware of security concerns.

Figure 1:
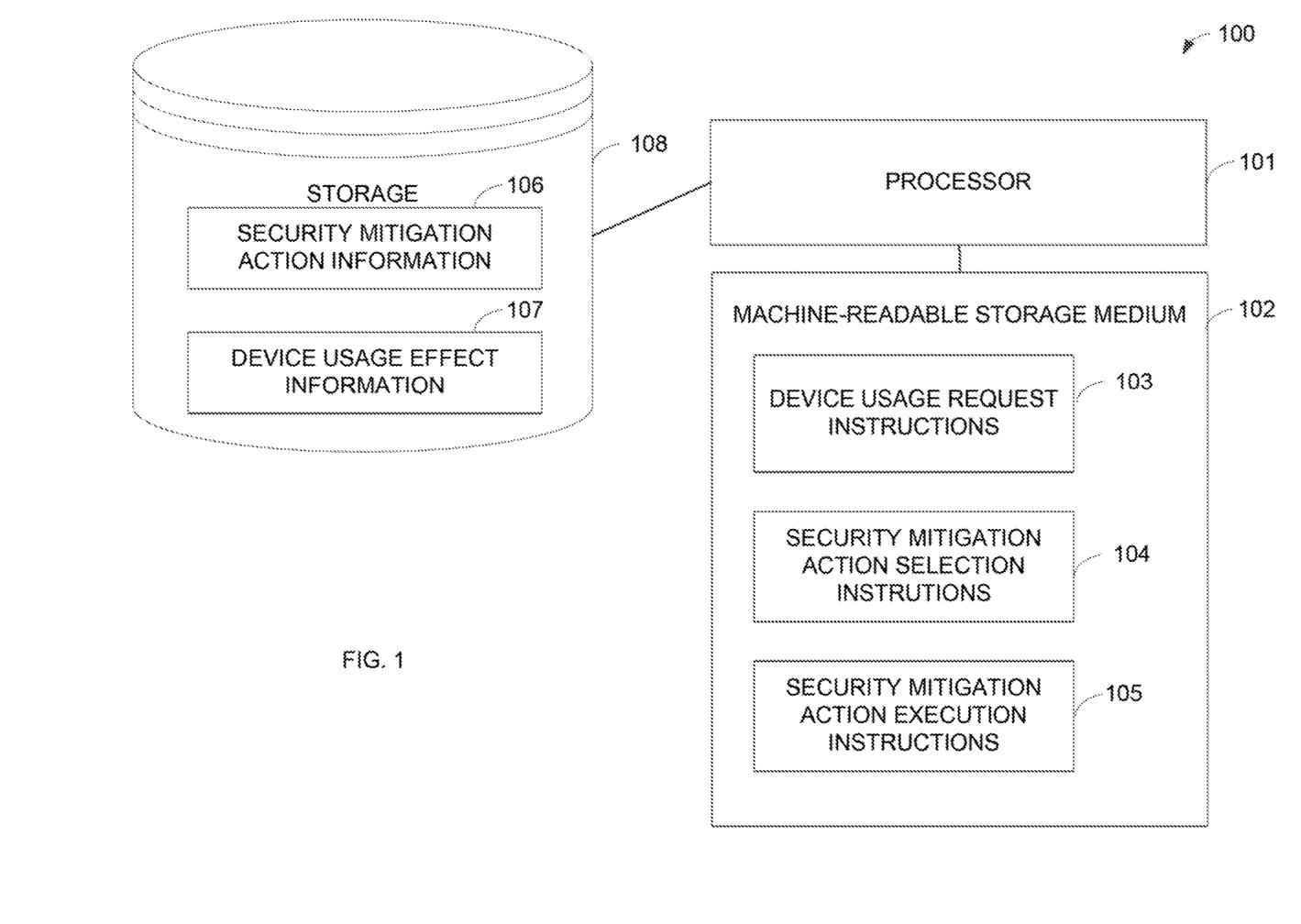
FIG. 1 is a block diagram illustrating one example of a computing system to select a security mitigation action based on device usage.

FIG. 1 is a block diagram illustrating one example of a computing system 100 to select a security mitigation action based on device usage. The computing system 100 may be used to automatically select a security mitigation action for a device based on the device usage. The computing system 100 includes a processor 101, machine-readable storage medium 102, and a storage 108. The computing system 100 may be implemented as a server communicating with a device experiencing a security incident, or the computing system 100 may be implemented as part of the device, such as part of an agent running on the device, executing within a hypervisor on the device, or any other implementation that allows the computing system 100 to monitor the user device. The processor 101 may be associated with a server providing security mitigation options to multiple devices, such as devices in the same organization or devices subscribing to the same service offered by the server. In one implementation, the functionality provided by the processor 101 is associated with a device monitored by the processor 101.

The storage 108 may be any suitable storage to communicate with the processor 101. The storage 108 may be associated with a device including the processor 101, or the processor 101 may communicate with the storage 108 via a network. The processor 101 may access information in the storage 108 to select a security mitigation action for a device. The storage 108 may include security mitigation action information 106 and device usage effect information 107.

The security mitigation action information 106 may include information about potential security mitigation actions. The security mitigation action information 106 may include information about a security mitigation action, types of security defects likely to be addressed by the security mitigation action, and/or the likely effect of the security mitigation action. For example, a security mitigation action may be associated with a high likelihood of completely resolving the security incident or may be associated with temporarily mitigating damage associated with the security incident. The security mitigation action, may be related to preventing a future security event similar to a detected security event, such as a security mitigation action related to instructions to avoid phishing schemes or not to open attachments.

The device usage effect information 107 may include information about device usage effects associated with a security mitigation action. The device usage effect information 107 may include information about a limitation to a device and/or a time period of the limitation associated with executing a particular security mitigation action. As an example, a security mitigation action may be associated with no device usage available for a two hour period or with limited device usage for a 30 minute period.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include device usage request instructions 103, security mitigation action selection instructions 104, and security mitigation action execution instructions 105.

The device usage request instructions 103 may include instructions to determine information about likely device usage during a period of time associated with a security mitigation action. The processor 101 may transmit a request to the user, such as by emailing the user or by causing a user interface to be displayed on the user device. The requested information may include, for example, a request for weighted information associated with a preferred time frame or preferred disruption type, such as where the user may select or rank a time frame or disruption type. The requested information may be related to user information associated with device usage, such as schedule or location over a period of time.

In one implementation, the processor 101 automatically determines the likely usage information, such as by checking stored calendar or other information associated with a user of the device. In one implementation, the request is related to device use context information, such as device location and/or networking information. For example, GPS coordinate information may be requested from the device with or without a user being aware of the request. For example, the device may be associated with a privacy profile that allows the device to return location information to the computing system 100.

The security mitigation action selection instructions 104 may include instructions for the processor 101 to automatically select a security mitigation action based on the received response to the request about device usage compared to the stored device usage effect information 107. For example, the security mitigation action selection instructions 104 may include instructions to select a subset of security mitigation actions from the security mitigation action information 106 where the subset is related to the particular type of security incident. The security mitigation action may be selected based on a comparison of the response to the device usage request compared to the device usage effect information 107. For example, the security mitigation actions associated with the type of security incident may be ranked based on applicability to the type of tolerated device usage limitations.

In one implementation, context information about the device usage may be taken into account. For example, the device usage may change during the period to which the security incident is being addressed. For example, current device location, such as whether in the US or China, whether in an office or public network may affect which security mitigation action is selected. The context information may include information about amount of available bandwidth and/or cost of bandwidth. In one implementation, an updated security mitigation action is selected when a change in the usage context is detected. In one implementation, a user may provide updated usage information, such as where a high priority task is being undertaken, and the security mitigation action may be updated accordingly.

In one implementation, additional information is determined to associate with the security mitigation action, such as a deadline. The deadline may be determined, for example, based on the severity of the security incident. The processor 101 may cause the security action to be automatically executed if not otherwise executed by the deadline. For example, a security mitigation action may be presented to the user along with the deadline. The user may select to execute the action earlier, such as where the user has a presentation on the device at a later point closer to the deadline. However, if the security mitigation action is not executed by the deadline, the action may be automatically executed. In one implementation, the security mitigation system causes a different security mitigation action to be performed if the selected action is not executed by the deadline. For example, the device may be locked if the selected mitigation action is not executed by the deadline.

In one implementation, a security mitigation workflow is selected. The workflow may be selected initially and updated based on testing occurring after a first security mitigation action is executed. The workflow may include a second selected security mitigation action from the security mitigation action information 106 to be executed after the first security mitigation action. The second security mitigation action may be selected to be a subsequent mitigation action, such as based on being associated with a greater amount of time to execute, associated with a more burdensome disruption to the device, and/or associated with a higher likelihood of success in resolving the security event. In one implementation, a first security mitigation action is selected to limit the effect of the security incident while limiting device usage constraints according to the received information, and a second security mitigation action is selected based on a time frame associated with fewer constraints and is associated with a higher likelihood of resolving the incident. For example, the first security mitigation action may be associated with preventing a command from the device from reaching a command and control center, and the second security mitigation action may involve re-imaging the device.

The security mitigation action execution instructions 105 includes instructions to cause the selected security mitigation action to be executed on the device. The processor may transmit, store, and/or display information about the selected security mitigation action. For example, the processor 101 may transmit information about the mitigation action to cause it to be executed by the device, the processor 101 may itself initiate the action, and/or the processor 101 may transmit information about the selected security mitigation action to another device, such as a router, to perform.

Figure 2:
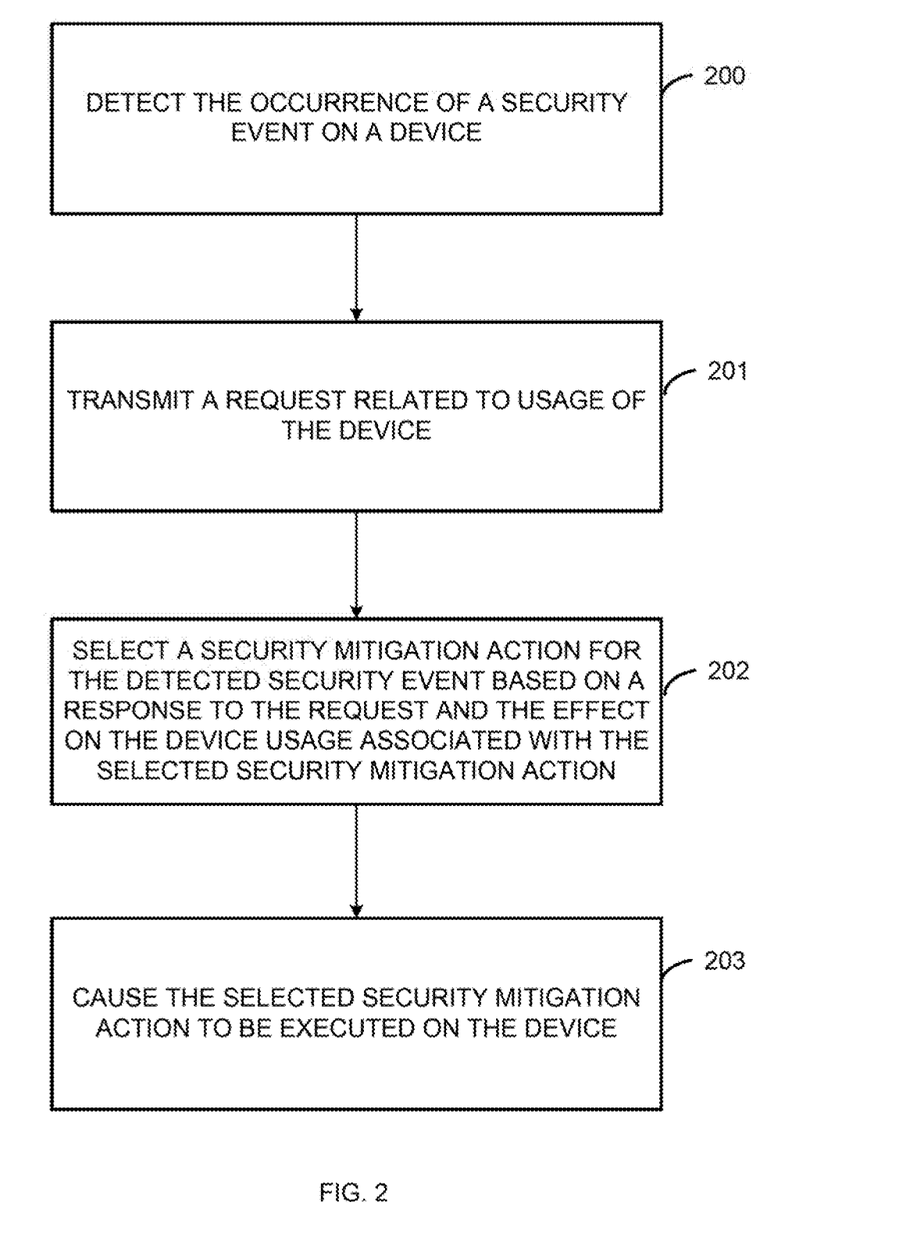
FIG. 2 is a flow chart illustrating one example of a method to select a security mitigation action based on device usage.

FIG. 2 is a flow chart illustrating one example of a method to select a security mitigation action based on device usage. For example, a processor may select a security mitigation action to address a security incident on a device taking into account the security incident and planned device usage. The security mitigation action may be selected to provide greater flexibility and balance security and business productivity concerns. The method may be implemented, for example, by a security mitigation system, such as the computing system 100 of FIG. 1. The method may be implemented by a server for managing security responses on remote devices, and/or the method may be implemented on a device on which the security response is managed, such as where the security responsibilities are managed by a device hypervisor.

Beginning at 200, a security mitigation system detects the occurrence of a security event on a device. The security event may be any suitable security event, such as a denial of service attack or infection. The security mitigation system may detect the security event in any suitable manner. The security mitigation system may monitor the device and detect the event and/or the security mitigation system may receive information from the device or another device indicating that the device is compromised. For example, an agent running on the device or on a hypervisor on the device may detect the security event on the device and communicate the information to the security mitigation system. In one implementation, the security mitigation system receives information about a security event related to a network, and a device on the network is associated with the security event. In one implementation, the security event is detected on the device based on information outside of the device, such as based on traffic from the device indicating that the device is communicating with a command and control center.

Continuing to 201, the security mitigation system transmits a request related to usage of the device. The security mitigation system may transmit the request in any suitable manner, such as via email, SMS, and/or a request to provide information via a web interface. The security mitigation system may transmit the request to the device, to a user associated with the device, or to a second device storing information associated with the user of the device. In one implementation, transmitting the request comprises requesting stored information associated with device usage, such as calendar information. The request may be related to circumstances associated with device use, such as the location of the device and the type of network the device is connected to. The request may be related to types of activities to occur on the device or user preferences for types of limitations. In one implementation, the request includes information about potential responses and their effect on device use. For example, a user may rank potential responses based on information indicating the associated device limitations.

In one implementation, transmitting a request causes a user interface to be displayed to receive input related to device usage. The input may be, for example, related to preferences related to device usage limitations associated with a security mitigation action, priority of current activity on the device, and/or upcoming planned activity for the device during a time period associated with a security mitigation action. The security mitigation system may cause the user interface to be displayed on the device and/or cause a user interface to be displayed on the device or another device, such as a different device associated with the same user, in response to a user launching the user interface from an email or other source. In one implementation, the security mitigation system provides the request in a manner that allows the user to update the status, such as by sending a subsequent email or by allowing the user to log back into a site. For example, an urgent task may come up after the user responds to the initial request.

Continuing to 202, the security mitigation system selects a security mitigation action for the detected security event based on a response to the request and the effect on the device usage associated with the selected security mitigation action. For example, the security mitigation action may be selected to balance security concerns in resolving the security event with the user concerns to have device access. The selection may further be based on usage circumstances, such as which country the device is being used in. In one implementation, a response may not be received to the request for device information, such as because a user selects not to respond or because communication with the device is unsuccessful. The security mitigation system may select a default action when a response is not received related to the device usage information. The security mitigation system may automatically cause some security mitigation actions to be performed and may use the device information and selection process for a subset of security mitigation actions that are likely to interfere with device usage. In one implementation, information about the selected security mitigation action may be provided to an administrator who may alter or escalate the selection.

The mitigation action may be any suitable mitigation action. Examples include a warning communicated to the user or an action taken in relation to the device. For example, the security mitigation action may include adding a firewall rule blocking traffic to a suspicious address or domain, removing a suspicious Certificate Authority certificate, warning a user not to use a USB stick, warning a user not to exchange data with colleagues, running an approved clean-up script, and/or re-imaging the device. The security action may be related to resolving the security event or preventing a further issue with a detected potential security event.

In one implementation, the security mitigation system selects a deadline to associate with the security mitigation action. The deadline may be a time that the security mitigation action is automatically initiated or a time at which the security mitigation action is initiated if not otherwise completed. For example, the security mitigation system may provide the user with a flexible time frame such that a user may select when to initiate the security mitigation action as long as it is initiated prior to the deadline. The deadline may be determined based on the user preferences, likelihood of the security mitigation action to resolve the incident, and/or device use context information. For example, a deadline may occur sooner where the security action is less likely to resolve the incident so that a more stringent security mitigation action may occur sooner. As another example, a deadline may be set sooner where the device is in a foreign country.

In one implementation, the security mitigation system receives input from an administrator related to acceptable risks and balances of device usage with security concerns. For example, different entities may have different tolerances for the amount of time to allow use of a device before causing a more drastic security mitigation action to be performed. The security mitigation system may access stored risk preference information and use the information to select the security mitigation action. For example, the security mitigation system may select a security mitigation action differently for devices associated with different entities with different risk profiles. In one implementation, there are different types of responses or risks accepted based on the role of the user, such as where the concern over a device associated with a user in a sales role may be related to spreading the security incident to customer devices and where the concern over a device associated with a user in an executive role may be related to preventing the leak of confidential data. The security mitigation system may select a security mitigation action based in part on the user role information.

In one implementation, the security mitigation system uses a different workflow for different entities or roles. In one implementation, the security mitigation system uses a decision tree or other data structure to select a security mitigation action where the decision tree takes into account information about the device and/or user to determine a security mitigation action to associate with a type of response related to device usage. For example, the selected security mitigation action may be different for the same device usage response where the other factors associated with the decision tree, such as user role, differ. In one implementation, the user role information is associated with the response to the device usage information, such as where the response includes user provided information about a schedule and a response to an automated database query related to user department.

In one implementation, the security mitigation system selects a security mitigation workflow. The workflow may be selected initially or may be selected sequentially in response to the results of a previous security mitigation action and/or based on a change in device usage or circumstances occurring after a previous security mitigation action. The workflow may be selected to provide flexibility in the response, such as to delay or avoid a security mitigation action associated with greater device usage limitations. In one implementation, a first security mitigation action is associated with a first deadline and a second security mitigation action is associated with a second later deadline, and the second security mitigation action is associated with a higher likelihood of resolving the security event. For example, a test may be executed to determine the status of the device after the first security mitigation action, and the second security mitigation action may be avoided if the status indicates that the security event is resolved after the first security mitigation action is performed.

In one implementation, the first security mitigation action is selected to limit the effect of the security event to provide a greater amount of time until a second security mitigation action to resolve the security event is performed, such as where the first security mitigation action is to prevent communications to a command and control center immediately, and the second security mitigation action is to re-image the device within five hours. In one implementation, a different second security mitigation action or a different deadline is selected according to the status results after the performance of the first security mitigation action. As an example, if an AV scan finds an infection and quarantines, the second security mitigation may be updated from re-imaging the system to a less invasive response of running an approved clean up script.

The security mitigation system may continue to select additional security mitigation actions, such as until device status information indicates the security event is resolved and/or information is received from an administrator indicating that the security event is closed. The security mitigation system may transmit an additional request for device information prior to selecting an additional security mitigation action for the workflow and/or periodically until the security event is resolved. In one implementation, the security mitigation system updates the selected security mitigation action based on updated device information. For example, the security mitigation system may receive updated information about planned usage, such as a user having unexpected free time or an unexpected deadline or device usage circumstances changing from a work network to a public network.

Continuing to 203, the security mitigation system causes the selected security mitigation action to be executed on the device. The security mitigation system may cause the security mitigation action to be executed in any suitable manner. The security mitigation system may determine when to cause the security mitigation action to be executed. For example, the security mitigation system may cause the security mitigation action to be executed when accepted by a user, such as prior to a deadline associated with the action, or at an established deadline if the security mitigation action is not yet executed.

The security mitigation system may output information about the selection such that another device executes the action. For example, the security mitigation system may display, transmit, and/or store information about the selected security mitigation action to be performed by the security mitigation system, by the affected device, or by another device. In one implementation, some aspects may be performed manually, such as where an action involves a user first to save or reboot or where a re-image is initiated manually by a support engineer. The security mitigation system may execute the security mitigation action to be executed at the deadline and/or transmit information to another device about the selected action and deadline to be initiated within the deadline by the other device.

In one implementation, the security mitigation action is executed by the device itself, such as where the security mitigation action involves changing operating system configurations or updating local firewall rules. As another example, the security mitigation action may be executed from a hypervisor on the device, such as where the security mitigation action is related to blocking a USB port on the device. The security mitigation action may be performed by another device in the network, such as where a network switch moves the device to a quarantined VLAN or imposes additional firewall rules. In one implementation, the execution depends on the type of security mitigation action as to whether executed remotely or by the device itself.

In one implementation, the security mitigation system may cause the security mitigation action to be executed and then reverses the security mitigation action. For example, the security mitigation system may roll back the security mitigation action where additional information is received indicating that the security incident was a false alarm. The security mitigation system may reverse a first security mitigation action and a select a second security mitigation action based on a response related to the effect of the first security mitigation action from the device and/or user. As an example, a security incident may be associated with the presence of a particular self-signed certificate within the authorized certificate list, and the security mitigation action may involve removing that particular certificate. The user and/or device may provide information to the security mitigation system indicating that the device is no longer able to connect to the EDI system after the removal of the certificate. The security mitigation system may save a copy of the certificate when it is removed from the device and replace the certificate in response to the unexpected usage limitation associated with the security mitigation action.

Figure 3:
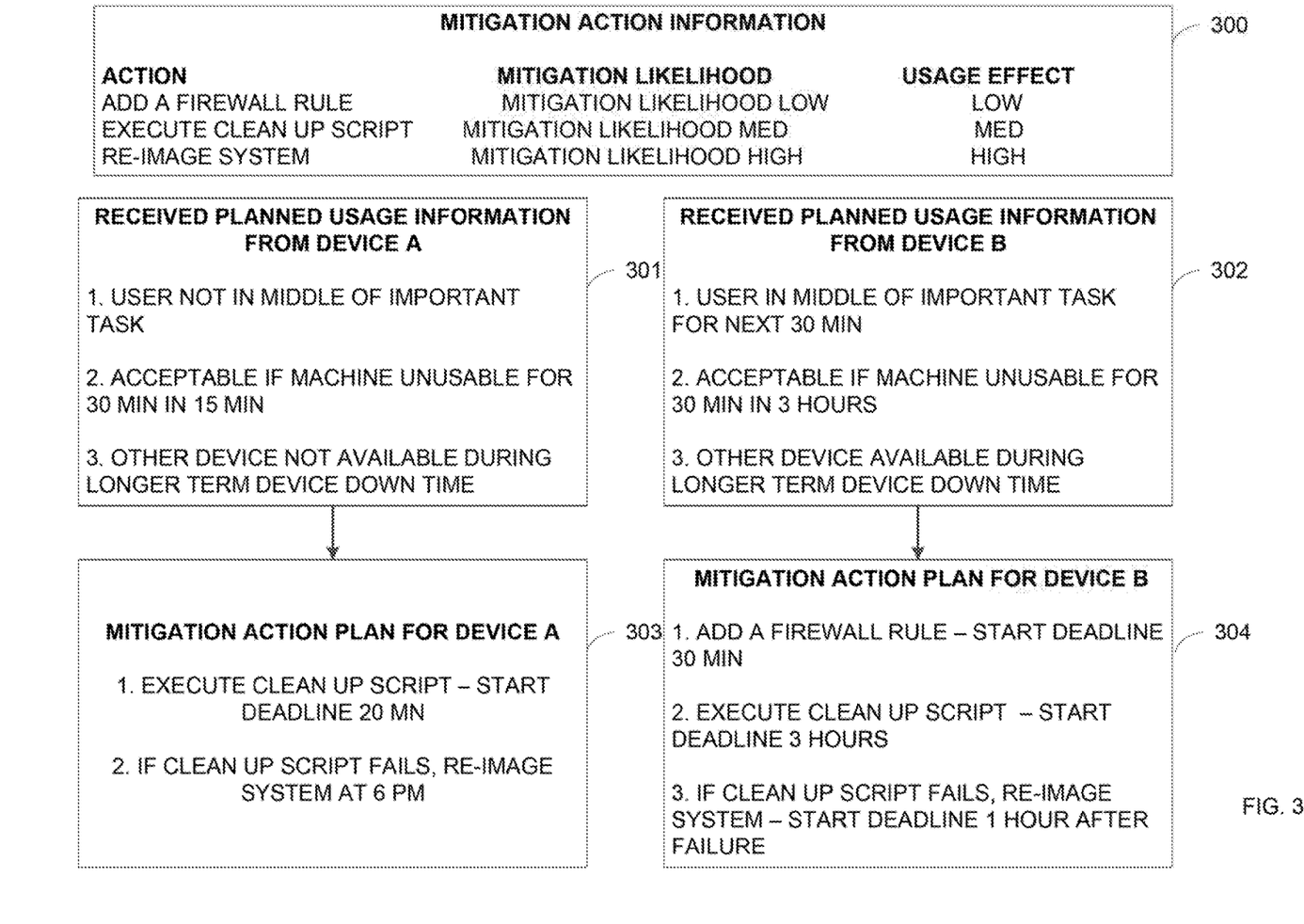
FIG. 3 is a diagram illustrating one example of selecting different security mitigation actions for different devices based on the device usage associated with the different devices.

FIG. 3 is a diagram illustrating one example of selecting different security mitigation actions for different devices based on the device usage associated with the different devices. Block 300 shows a list of potential security mitigation actions and information associated with the security mitigation actions. For example, there are three potential actions to respond to a security incident, a likelihood of resolution, and information about the usage effect. The information may be comparative or more specific, such as low device limitation, or device limitation causing slightly slower device response but full usage allowed.

A security incident may be detected, and mitigation actions may be selected for devices A and B in the network affected by the security incident. Block 301 shows information received related to device A usage. For example, a user of device A may input the information into a user interface.

The information related to device A indicates that there may be some flexibility in the selected security mitigation action because the user is not in the middle of an important task. The user does not have a back-up device available. Block 302 shows information received related to device B usage. The information in block 302 indicates that the user is in the middle of a high priority task, but the user has a back-up device available.

Blocks 303 and 304 show information about selected mitigation actions to the security event for device A and device B. The selected actions and timing deadlines may differ depending on the information received related to device usage. For example, block 303 shows that the selected security mitigation workflow includes a first action to start quickly and a second action to start after business hours. The workflow may be selected due to the fact that the user is not in the middle of high priority task that may not be interrupted and that more invasive security mitigation actions may prevent the user from carrying out regular business due to the lack of a substitute device. The first security mitigation action is associated with a medium likelihood of success, the second security mitigation action is associated with a high likelihood of success. However, the second security mitigation action is also associated with greater device limitations, and it is selected as a second action to be performed if the first action fails and to be executed at a later time associated with less user inconvenience.

Block 304 shows that a different security mitigation workflow is selected for device B than for device A. For example, an initial action is delayed 30 minutes due to the information related to device usage. However, more limiting actions are initiated sooner than for device A. There may be a preference to initiate the actions sooner as reasonable to avoid additional security problems due to the fact that the user had fewer conflicts after the 30 minute delay. The workflow includes three actions, a security mitigation action to add a firewall rule to occur within 30 minutes, a second security mitigation action to run a clean-up script to occur at a later more convenient time, and a more burdensome action to re-image the device to be performed last if the previous security mitigation action was unsuccessful. The different workflows are automatically selected to balance difference user device usage concerns with security mitigation concerns.

Figure 4:
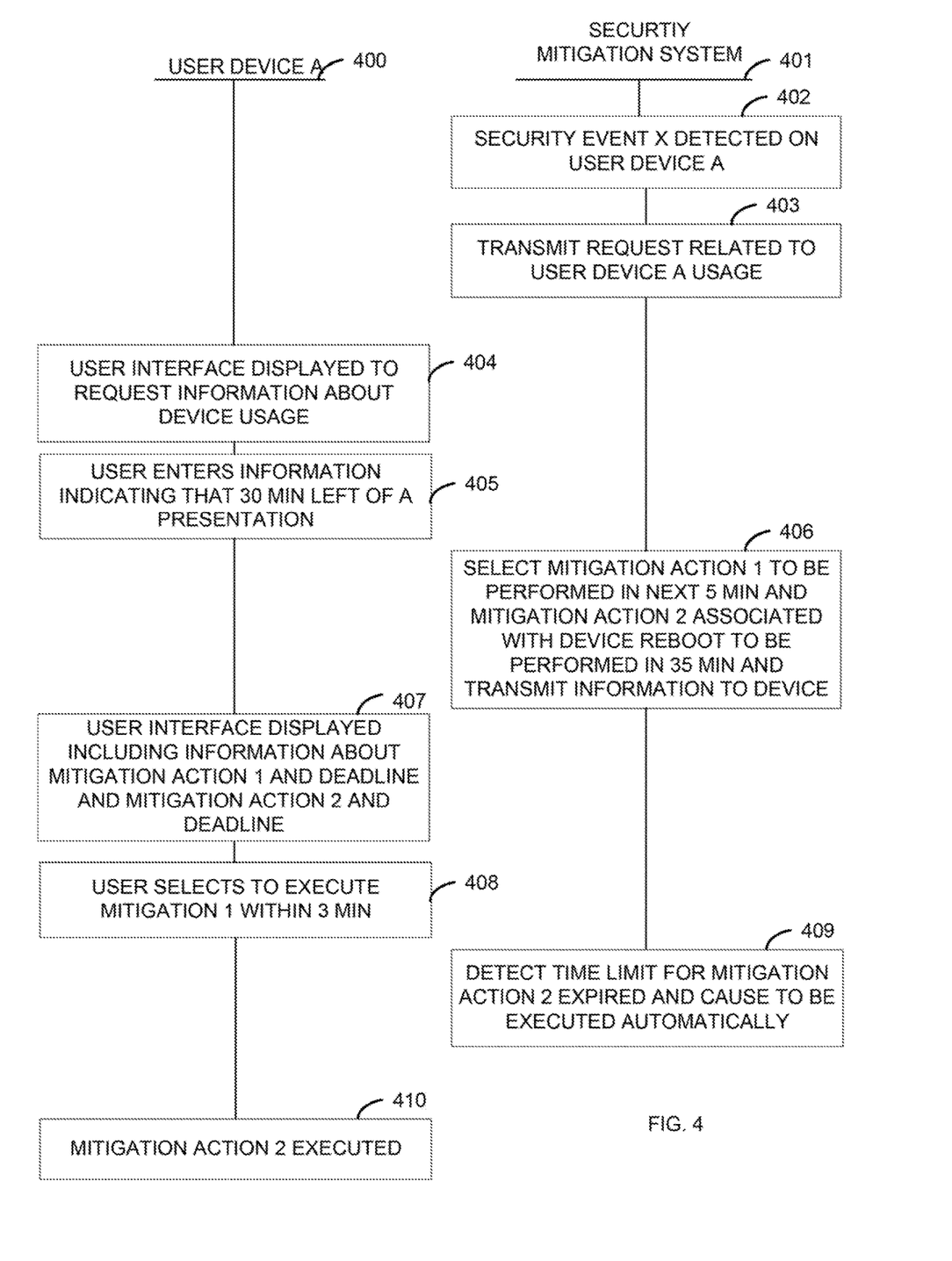
FIG. 4 is a diagram illustrating one example of selecting a security mitigation action based on device usage.

FIG. 4 is a diagram illustrating one example of selecting a security mitigation action based on device usage. For example, timeline 400 associated with a device shows actions taken in relation to a device associated with a security event, and timeline 401 related to a security mitigation system show actions taken by a processor to mitigate the security incident associated with the device. The user device may be any suitable device, such as a laptop or mobile phone. The security mitigation system may be any suitable security mitigation system. In one implementation, the security mitigation system is designed to mitigate security incidents across multiple devices. The security mitigation system may be associated with a service that provides IT services and security mitigation for multiple entities.

Beginning at 402, the security mitigation system detects security event X on device A. Security event X may be, for example, a detection of traffic from the user device communicating with a command and control center. The security mitigation system may detect event X in any suitable manner, such as based on an analysis of user device A, based on a notification from user device A, and/or based on a notification from another device.

Continuing to 403, the security mitigation system transmits a request to user device A related to usage of user device A. The request may be tailored to the specific security incident, such as based on the limitations associated with the set of mitigation actions associated with the particular security incident.

Continuing to 404, a user interface is displayed on user device A to request information about device usage. The user interface may be automatically displayed or may be displayed when selected from an email or other communication. Continuing to 405, the user associated with user device A may provide information indicating that the device will be used in a presentation for the next 30 minutes.

Continuing to 406, the security mitigation system selects a mitigation action based on the received information related to use of user device A. The security mitigation system selects mitigation action 1 to be performed in the next 5 minutes and mitigation action 2 associated with a device reboot to be performed in 35 minutes. The security mitigation system transmit information about the mitigation action selections to user device A.

Continuing to 407, user device A displays a user interface providing information about the selected mitigation actions and deadlines. The information may be displayed such that the user may select a more convenient time within the provided window prior to the deadline if desired. Continuing to 408, a user may select to execute mitigation action 1 at 3 minutes prior to the 5 minute deadline. Continuing to 409, the security mitigation system may detect that mitigation action 2 was not executed within the 35 minute deadline and cause mitigation action 2 to be automatically executed. Continuing to 410, user device A executes mitigation action 2. The security mitigation system selects mitigation actions and associated deadlines in a manner that conforms to user device use preferences while ensuring that security policies are met.

The invention claimed is:

1. A computing system, comprising:
   a non-transitory storage to store:
   information about security mitigation actions comprising mitigation likelihoods, wherein the security mitigation actions are associated with the mitigation likelihoods and with a security event, respectively, and wherein the mitigation likelihoods are likelihoods of the associated security mitigation actions to resolve the security event;
   information about an effect on device usage associated with the security mitigation actions, respectively; and
   a processor to:
   request information about planned usage of a device associated with a detected security event;
   select, from the stored security mitigation actions a security mitigation action and a second security mitigation action to be executed after the selected security mitigation action, wherein the selected security mitigation action is associated with limiting an effect of the security event and the second security mitigation action is associated with a higher mitigation likelihood of resolving the security event,
   wherein the selected security mitigation action is associated with the detected security event, and
   wherein the selection is based on information received in response to the request compared to the stored device usage effect information associated with the selected security mitigation action; and cause the selected security mitigation action to be executed on the device.

2. The computing system of claim 1, wherein the second security mitigation action is as compared to the selected security mitigation action at least one of: associated with a greater amount of time to execute, or associated with a more burdensome disruption to the device.

3. The computing system of claim 1, wherein the processor is further to: determine a deadline associated with the selected security mitigation action; and wherein the processor is further to cause the selected security mitigation action to be automatically executed if not otherwise executed by the deadline.

4. The computing system of claim 1, wherein requesting information about planned usages comprises causing a user interface to be displayed to receive information related to at least one of: time frame preference information for a security mitigation action on the device and device disruption type preference associated with the security mitigation action.

5. A method comprising:
   detecting an occurrence of a security event on a device;
   transmitting a request related to usage of the device;
   selecting a security mitigation action and a second security mitigation action to be executed after the selected security mitigation action for the detected security event based on a response to the request and an effect on the device usage associated with the selected security mitigation action, wherein the selected security mitigation action is associated with a stored mitigation likelihood, wherein the stored mitigation likelihood is a likelihood of the associated selected security mitigation action to resolve the detected security event, and wherein the selected security mitigation action is associated with limiting an effect of the security event and the second security mitigation action is associated with a higher mitigation likelihood of resolving the security event; and
   causing the selected security mitigation action to be executed on the device.

6. The method of claim 5, wherein the selected security mitigation action is associated with a first deadline and the second security mitigation action is associated with a second later deadline.

7. The method of claim 5, wherein transmitting a request comprises causing a user interface to be displayed to receive input related to at least one of: preferences related to device usage limitations associated with a security mitigation action, priority of current activity on the device, and upcoming planned activity for the device during a time period associated with a security mitigation action.

8. The method of claim 5, wherein transmitting a request comprises at least one of: requesting stored information associated with planned device usage, requesting device usage location information, and requesting device usage networking information.

9. The method of claim 5, further comprising selecting a deadline to associate with the selected security mitigation action.

10. The method of claim 9, wherein causing the selected security mitigation action to be executed on the device comprises causing the selected security mitigation action to be executed at least one of: at a time when accepted by a user prior to the deadline and at the deadline if not already executed.

11. A machine-readable non-transitory storage medium with instructions executable by a processor to:
    select a security mitigation action and a second security mitigation action to be executed after the selected security mitigation action for a device based on information related to usage of the device and associated usage limitations associated with the selected security mitigation action, wherein the selected security mitigation action is associated with a stored mitigation likelihood, wherein the stored mitigation likelihood is a likelihood of the associated selected security mitigation action to resolve a security event, and wherein the selected security mitigation action is associated with limiting an effect of the security event and the second security mitigation action is associated with a higher mitigation likelihood of resolving the security event; and
    output information related to the selected security mitigation action.

12. The machine-readable non-transitory storage medium of claim 11, further comprising instructions to cause a user interface to be displayed to receive information related to prioritization of at least one of: timing of a security mitigation action and type of device limitation associated with a security mitigation action.

13. The machine-readable non-transitory storage medium of claim 11, wherein
    the selected security mitigation action is associated with a first deadline and the second security mitigation action is associated with a second later deadline, and wherein the instructions are executable by the processor to determine to execute the second security mitigation action based on device status after execution of the first security mitigation action.

* * * * *